(12) United States Patent
Gejima et al.

(10) Patent No.: US 7,171,988 B2
(45) Date of Patent: Feb. 6, 2007

(54) TUBING FOR HYDROSTATIC FORMING, HYDROSTATIC FORMING APPARATUS, AND HYDROSTATIC FORMING METHOD USING THE APPARATUS

(75) Inventors: Fumihiko Gejima, Yokohama (JP); Hiroshi Sakurai, Kanagawa (JP); Kenji Kanamori, Yokohama (JP); Tetsuji Morita, Kanagawa (JP); Sadao Yanagida, Kanagawa (JP); Masayuki Inoue, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 29 days.

(21) Appl. No.: 11/001,093

(22) Filed: Dec. 2, 2004

(65) Prior Publication Data

US 2005/0121096 A1 Jun. 9, 2005

(30) Foreign Application Priority Data

| Dec. 8, 2003 | (JP) | ............................ 2003-408688 |
| Dec. 25, 2003 | (JP) | ............................ 2003-429227 |
| Mar. 25, 2004 | (JP) | ............................ 2004-089733 |

(51) Int. Cl.
*F16L 9/00* (2006.01)

(52) U.S. Cl. .................. 138/156; 138/171; 138/170; 138/163; 29/6.1

(58) Field of Classification Search ............... 138/156, 138/170, 171, 163, 162; 29/6.1
See application file for complete search history.

(56) References Cited

U.S. PATENT DOCUMENTS

| 265,306 | A | * | 10/1882 | Culver ....................... 138/171 |
| 1,332,932 | A | * | 3/1920 | Sussman ..................... 138/171 |
| 2,067,801 | A | * | 1/1937 | Taylor ........................ 138/154 |
| 2,120,007 | A | * | 6/1938 | Tear ........................... 222/386 |
| 2,706,328 | A | * | 4/1955 | Karmazin ................... 228/144 |
| 2,730,135 | A | * | 1/1956 | Wallace ...................... 138/171 |
| 3,040,781 | A | * | 6/1962 | Reymann et al. ........... 138/145 |
| 3,066,063 | A | * | 11/1962 | Ecklund et al. ............. 156/203 |
| 3,419,183 | A | * | 12/1968 | Khoury ....................... 220/689 |
| 3,692,063 | A | * | 9/1972 | Wagele ........................ 138/139 |
| 3,864,507 | A | * | 2/1975 | Fox et al. ................... 174/14 R |
| 4,033,474 | A | * | 7/1977 | Rentmeester ................ 220/680 |
| 4,164,243 | A | * | 8/1979 | Cookson et al. ............. 138/162 |
| 4,256,254 | A | * | 3/1981 | Cookson et al. ............. 228/166 |
| 5,924,457 | A | * | 7/1999 | Inaba et al. ................. 138/162 |

FOREIGN PATENT DOCUMENTS

| JP | 10-71433 A | 3/1998 |
| JP | 2002-178050 A | 6/2002 |

* cited by examiner

*Primary Examiner*—Patrick F. Brinson
(74) *Attorney, Agent, or Firm*—Foley & Lardner LLP

(57) ABSTRACT

A tubing including an overlap portion formed by the first and second circumferential end portions overlapping and joined with each other, and a fluid leakage preventing member for preventing pressurized fluid from leaking from the tubing upon the tubing being subjected to hydrostatic forming. An apparatus and method for hydrostatic forming of a tubing having an overlap portion. The apparatus includes a die and a nozzle having fluid leakage preventing means for preventing the pressurized fluid supplied into the tubing from leaking from a clearance between the first and second circumferential end portions of the overlap portion of the tubing at the longitudinal end portions of the tubing.

22 Claims, 13 Drawing Sheets

TUBING FOR HYDROSTATIC FORMING, HYDROSTATIC FORMING APPARATUS, AND HYDROSTATIC FORMING METHOD USING THE APPARATUS

BACKGROUND OF THE INVENTION

The present invention relates to a tubing for hydrostatic forming, a hydrostatic forming apparatus and a hydrostatic forming method using the apparatus.

In conventional hydrostatic forming, a tubing, for instance, an electric resistance welded tube, an aluminum alloy extrusion tube and the like, has been formed into a hydrostatic-formed article having a desired shape by using a hydrostatic forming apparatus. The hydrostatic forming apparatus has a specific nozzle for preventing the pressurized fluid from leaking from end surfaces of opposite end portions of the tubing upon applying pressurized fluid to the tubing through the nozzle. The nozzle is inserted into the opposite end portions of the tubing and seals the inside of the tubing. Japanese Patent Application First Publication No. 10-71433 discloses such a nozzle for hydrostatic forming as described above.

In addition, there has been proposed a hydrostatic forming apparatus having a pressing member that applies a pressing force onto end surfaces of the opposite end portions of the tubing in a longitudinal direction of the tubing, and a seal member that is inserted into the opposite end portions of the tubing and seal the inside of the tubing. Japanese Patent Application First Publication No. 2002-178050 discloses such a hydrostatic forming apparatus as described above.

SUMMARY OF THE INVENTION

However, the electric resistance welded tube and the aluminum alloy extrusion tube are expensive, causing increase in the production cost. Further, in a case where a tubing made of other inexpensive plates is formed by joining end portions of the plate by butt welding, the plate is required to have a sufficient thickness for the butt welding and the butt welding of the end portions of the plate must be carried out with high accuracy. Further, extremely high forming technology is required in order to form the tubing having a cross section having a desired shape. Therefore, even when the tubing is made of the inexpensive plates, there will occur deterioration in productivity and increase in production cost.

Further, a tubing may be formed by overlaying one of the end portions of the plate on the other thereof and joining the overlapping end portions with each other. However, in such a case, a step will be formed adjacent to the overlapping end portions of the tubing. This makes it difficult to suppress leakage of the pressurized fluid which will occur at the step.

Further, in a case where the tubing having the overlapping end portions is formed using the nozzle described in Japanese Patent Application First Publication No. 10-71433, it will be difficult to prevent the pressurized fluid from leaking from a clearance between the overlapping end portions of the tubing. In order to suppress the leakage of the pressurized fluid, the clearance between the overlapping end portions of the tubing can be sealed by a method such as welding. In this case, productivity will be lowered so that the production cost will be increased.

In a case where the tubing having the overlapping end portions is formed using the hydrostatic forming apparatus described in Japanese Patent Application First Publication No. 2002-178050, the seal member of the hydrostatic forming apparatus which is made of an elastic material will be pressed by the pressing member, and therefore, tends to suffer from damage or crack. Further, in such a case, upon hydrostatic forming, the overlapping end portions of the tubing will be longitudinally displaced or deformed. This causes deterioration in sealing and leakage of the pressurized fluid therefrom.

It is an object of the present invention to provide a tubing, a hydrostatic forming apparatus and a hydrostatic forming which are excellent in cost-saving and productivity.

In one aspect of the present invention, there is provided a tubing for hydrostatic forming, comprising:
a first circumferential end portion;
a second circumferential end portion;
an overlap portion formed by the first and second circumferential end portions overlapping and joined with each other, the second circumferential end portion being overlaid on the first circumferential end portion; and
a fluid leakage preventing member for preventing pressurized fluid from leaking from the tubing upon the tubing being subjected to hydrostatic forming.

In a further aspect of the present invention, there is provided an apparatus for hydrostatic forming of a tubing, the tubing including longitudinal end portions, first and second circumferential end portions and an overlap portion formed by the first and second circumferential end portions overlapping and joined with each other, the apparatus comprising:
a die for clamping the tubing; and
a nozzle fittable into each of the longitudinal end portions of the tubing, the nozzle including an opening through which pressurized fluid is supplied into the tubing, and fluid leakage preventing means for preventing the pressurized fluid supplied into the tubing from leaking from a clearance between the first and second circumferential end portions of the overlap portion at the longitudinal end portions of the tubing.

In a still further aspect of the present invention, there is provided a method for hydrostatic forming of a tubing using a hydrostatic forming apparatus, the tubing including longitudinal end portions, first and second circumferential end portions and an overlap portion formed by the first and second circumferential end portions overlapping and joined with each other, the hydrostatic forming apparatus including a die, a nozzle fittable into each of the longitudinal end portions of the tubing and having a butting surface and a seal surface, the method comprising:
setting the tubing inside the die;
closing the die inside which the tubing is set;
inserting the nozzle into each of the longitudinal end portions of the tubing until the butting surface of the nozzle is pressed on an end surface of the longitudinal end portion of the tubing, and at the same time, the seal surface of the nozzle is pressed on an end surface of the overlap portion of the tubing which is located in the longitudinal direction of the tubing, to thereby seal a clearance between the first and second circumferential end portions of the overlap portion; and
supplying the pressurized fluid into the tubing through the nozzle.

DETAILED DESCRIPTION OF THE INVENTION

Figure 1:
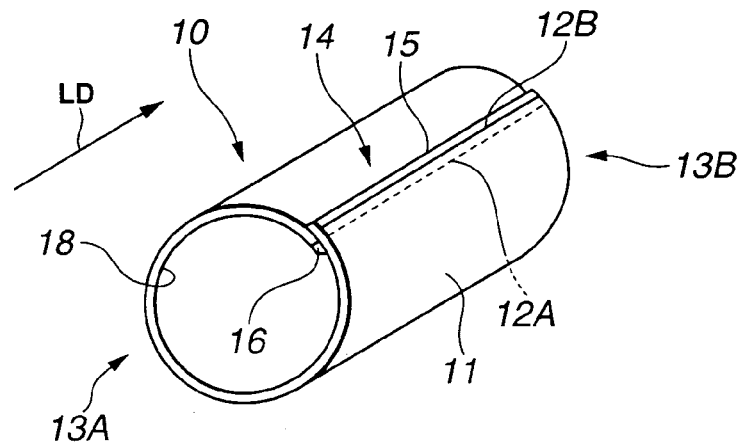
FIG. 1 is a perspective view of a tubing for hydrostatic forming according to the present invention, of a first embodiment.
Figure 2:
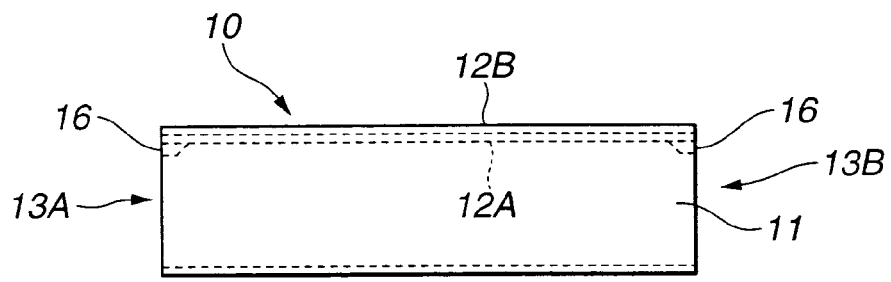
FIG. 2 is a side view of the tubing shown in FIG. 1.
Figure 3:
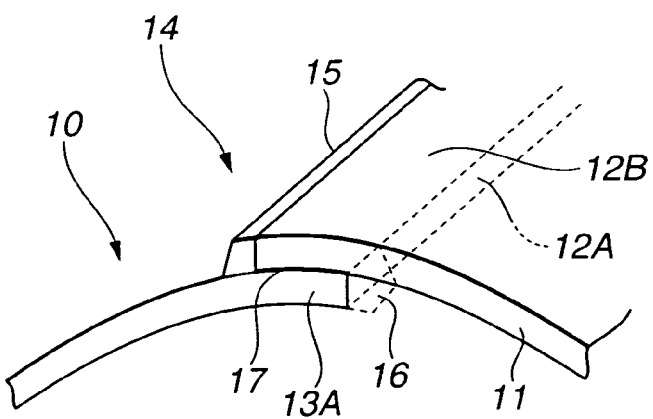
FIG. 3 is a partially enlarged view of the tubing shown in FIG. 1.

In the followings, embodiments of the present invention will be described with reference to the accompanying drawings. Referring to FIGS. 1–15, a first embodiment of the present invention is explained. FIGS. 1–3 show tubing 10 for hydrostatic forming, which is set in a hydrostatic forming apparatus as explained later and supplied with pressurized fluid to thereby be formed into a hydrostatic-formed article having a desired shape. As seen from FIGS. 1 and 2, tubing 10 includes inner and outer circumferential end portions 12A and 12B, and overlap portion 14 formed by inner and outer circumferential end portions 12A and 12B overlapping and joined with each other. Namely, outer circumferential end portion 12B is overlaid on inner circumferential end portion 12A. With the provision of overlap portion 14, tubing 10 has an inside step on an inner circumferential surface thereof and an outside step on an outer circumferential surface thereof which are disposed adjacent to overlap portion 14. Tubing 10 also includes single wall portion 11 and longitudinal end portions 13A and 13B opposed to each other in a longitudinal direction of tubing 10.

Specifically, tubing 10 is made of a plate having a uniform thickness. For instance, the plate is a steel plate or a high-strength steel plate having a thickness of 0.5–5 mm. The plate may be a stainless steel plate, an aluminum plate, an aluminum alloy plate or the like. The plate having a rectangular shape is formed into a tubular shape having a generally circular cross section, in such a manner that lateral end portions thereof disposed in a lateral direction perpendicular to a longitudinal direction of the plate, namely, longitudinal direction LD of tubing 10, overlap each other. The overlapping lateral end portions are then joined together by subjecting to lap-fillet welding at 15 from an outside of the tubular-shaped body in longitudinal direction LD. Thus, tubing 10 having overlap portion 14 is obtained. The lateral end portions of the plate act as inner and outer circumferential end portions 12A and 12B of tubing 10.

Fillet weld 15 is formed at overlap portion 14 in longitudinal direction LD of tubing 10. Specifically, fillet weld 15 extends adjacent to an end surface of outer circumferential end portion 12B in longitudinal direction LD over an entire length of tubing 10. The method of welding overlap portion 14 is not limited to the lap-fillet welding, and other welding methods may be selected if there occurs no hole or clearance causing fluid leakage in longitudinal direction LD of tubing 10. Upon forming the plate into the tubular shape of tubing 10, it is required to accurately control the circumferential length of the circular cross section, but it is not required that the roundness of the circular and the overlapping amount of circumferential end portions 12A and 12B of overlap portion 14 are adjusted with high accuracy. That is, upon forming tubing 10 by using the plate, the lap-fillet welding can be performed without high accuracy of positioning and machining of end surfaces of the lateral end portions of the plate, unlike butt welding. The lap-fillet welding can be readily performed irrespective of whether a thickness of the plate is small or not. Further, the manner of forming tubing 10 by overlaying one of the lateral end portions of the plate on the other thereof is simple and can be achieved without high forming technology.

Tubing 10 further includes a fluid leakage preventing member for preventing the pressurized fluid supplied to tubing 10 from leaking from each of longitudinal end portions 13A and 13B upon tubing 10 being subjected to hydrostatic forming. The fluid leakage preventing member is provided in the form of weld overlay 16 formed inside each of longitudinal end portions 13A and 13B and adjacent to overlap portion 14 in the circumferential direction of tubing 10.

Specifically, weld overlay 16 is formed only at each of longitudinal end portions 13A and 13B and at the inside step on the inner circumferential surface of tubing 10. Weld overlay 16 is located circumferentially adjacent to an end surface of inner circumferential end portion 12A. FIG. 3 shows weld overlay 16 disposed at longitudinal end portion 13A. In this embodiment, weld overlay 16 is formed of deposited metal in view of easiness and formed by arc welding in view of productivity. When the pressurized fluid supplying nozzle is inserted into each of longitudinal end portions 13A and 13B, weld overlay 16 is cut or deformed by the nozzle to thereby seal the clearance between the inner circumferential surface of each of longitudinal end portions 13A and 13B and the outer circumferential surface of the nozzle. Therefore, the pressurized fluid supplied to tubing 10 via the pressurized fluid supplying nozzle can be prevented from leaking from the clearance upon hydrostatic forming. Weld overlay 16 may be formed in an inside position spaced from a distal end surface of each of longitudinal end portions 13A and 13B in the longitudinal direction of tubing 10. In such a case, the fluid leakage can be suppressed upon hydrostatic forming. Namely, weld overlay 16 is formed within a region that longitudinally inwardly extends from a distal end surface of each of longitudinal end portions 13A and 13B and is pressed by the nozzle inserted into longitudinal end portion 13A and 13B. The fluid leakage can be suppressed within the region upon hydrostatic forming.

Preferably, weld overlay 16 is subjected to a suitable working, for instance, machining or cutting, so as to have an inner surface smoothly continue to the inner circumferential surface of each of longitudinal end portions 13A and 13B without forming a step therebetween. In such a case, the number of production steps of forming tubing 10 increases, but wear caused on the outer circumferential surface of the nozzle can be suppressed whereby life of the nozzle will be prolonged. In addition, sealing between the outer circumferential surface of the nozzle and the inner circumferential surface of each of longitudinal end portions 13A and 13B can be enhanced.

Further, the deposited metal forming weld overlay 16 preferably has a hardness less than that of the metal forming tubing 10. In this case, weld overlay 16 can be readily cut or deformed, whereby the life of the nozzle will be further increased and the sealing between the outer circumferential surface of the nozzle and the inner circumferential surface of each of longitudinal end portions 13A and 13B can be further enhanced.

Tubing 10 further includes seal member 17 that is disposed between circumferential end portions 12A and 12B of overlap portion 14 and seals a clearance therebetween. Seal member 17 is provided in the form of an intervening weld junction disposed in a clearance between circumferential end portions 12A and 12B of overlap portion 14. With the provision of seal member 17 in addition to fillet weld 15, the occurrence of fluid leakage in the longitudinal direction of tubing 10 can be more effectively suppressed.

Figure 4:
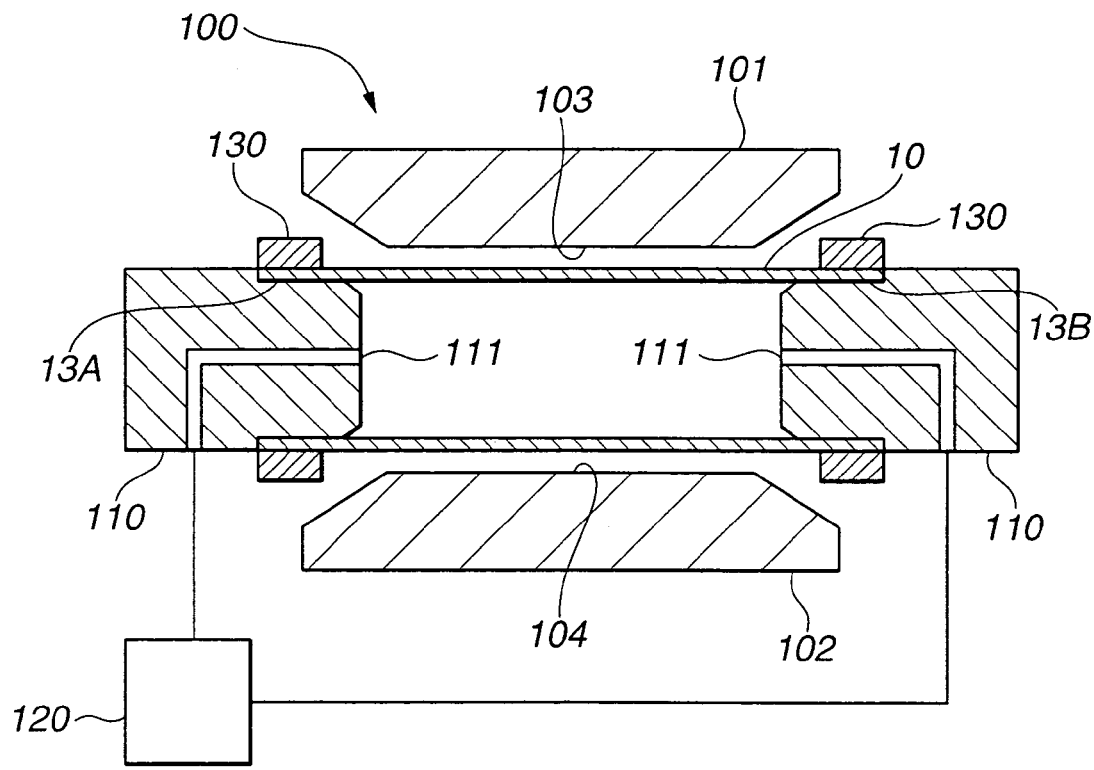
FIG. 4 is a cross section of a hydrostatic forming apparatus in which the tubing of the first embodiment is set.

Referring to FIGS. 4–8, the hydrostatic forming apparatus and method using tubing 10 is explained. As illustrated in FIG. 4, hydrostatic forming apparatus 100 includes a die constituted of upper die 101 and lower die 102, two nozzles 110 for supplying pressurized fluid, pressurized fluid generating device 120, and two fixing rings 130. Upper die 101 and lower die 102 have cavities 103 and 104, respectively, in which tubing 10 is set. Upper die 101 and lower die 102 are arranged to be relatively moveable close to and away from each other. Upper die 101 and lower die 102 cooperate to clamp and form tubing 10 into a desired shape. Two nozzles 110 are arranged spaced from each other on the outside of upper and lower dies 101 and 102. Two nozzles 110 are relatively moveable in an axial direction thereof. Two fixing rings 130 are disposed on outer circumferential surfaces of longitudinal end portions 13A and 13B of tubing 10.

Figure 5:
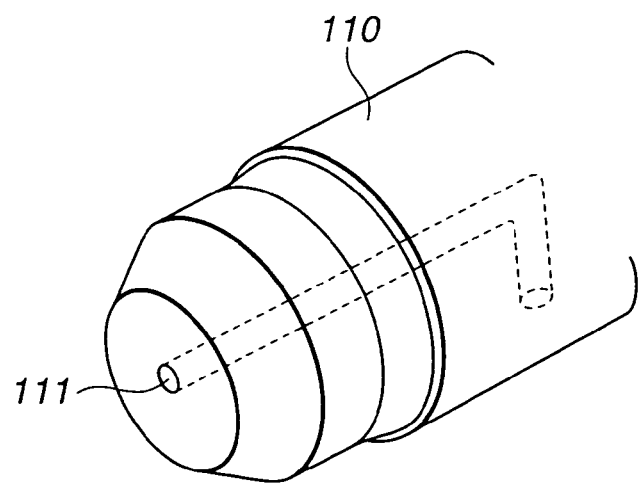
FIG. 5 is an enlarged perspective view of a pressurized fluid supplying nozzle of the hydrostatic forming apparatus shown in FIG. 4.

As illustrated in FIG. 5, each of two nozzles 110 has a generally cylindrical shape and includes a large-diameter portion, a small-diameter portion and a tapered end portion. A fluid passage extends from the large-diameter portion and opens to an end surface of the tapered end portion as indicated by broken line in FIG. 5. Pressurized fluid fed from pressurized fluid generating device 120 into each of two nozzles 110 is supplied into tubing 10 through opening 111 of the fluid passage of nozzle 110.

Figure 6:
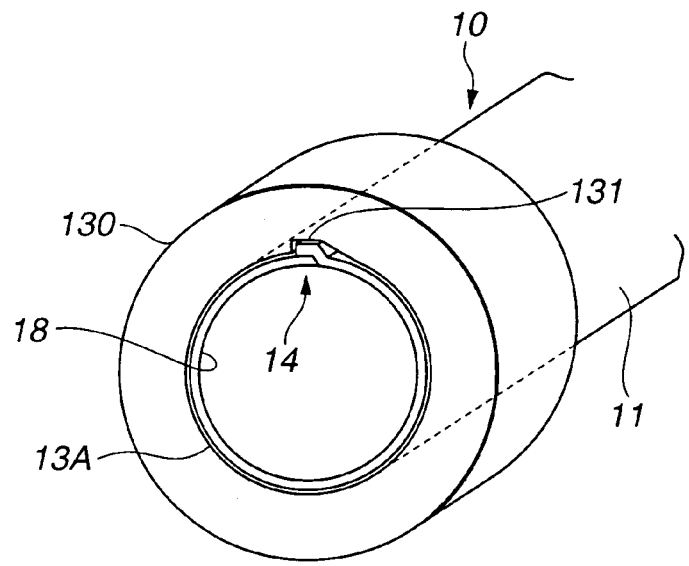
FIG. 6 is an enlarged perspective view of a fixing ring of the hydrostatic forming apparatus shown in FIG. 4, which is set on the tubing of the first embodiment.
Figure 7:
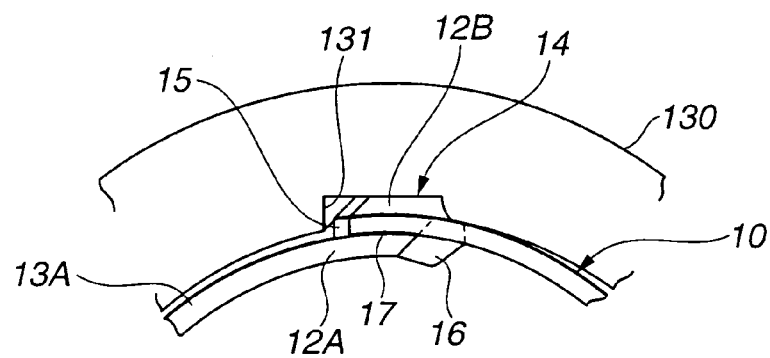
FIG. 7 is a partially enlarged view of FIG. 6.

Each of fixing rings 130 has notch 131 on a part of an inner circumferential surface thereof. FIG. 6 shows only one of fixing rings 130. Notch 131 is formed corresponding to overlap portion 14 of tubing 10 and engageable with overlap portion 14. Notch 131 serves for positioning of fixing rings 130 relative to tubing 10. Otherwise, notch 131 may be formed on an inner circumferential surface of upper die 101 or lower die 102. In such a case, fixing ring 130 can be omitted.

Figure 8:
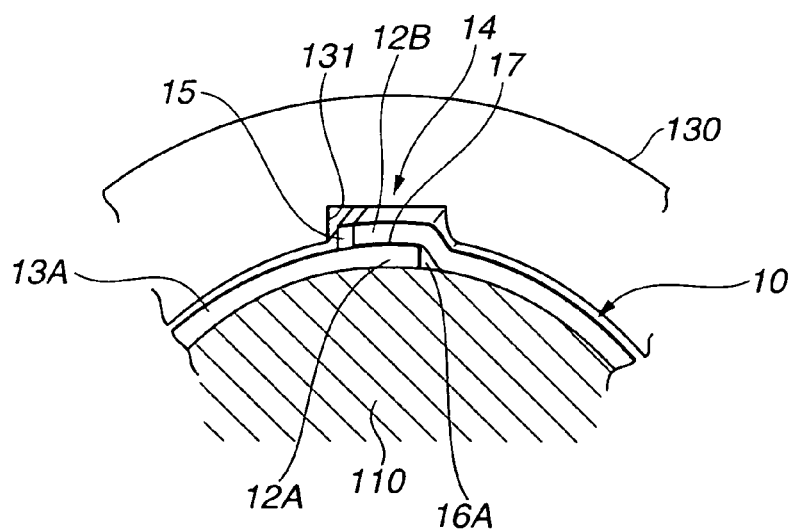
FIG. 8 is an explanatory diagram illustrating the pressurized fluid supplying nozzle of FIG. 5 inserted into the tubing of the first embodiment.

The hydrostatic forming method will be explained hereinafter. First, fixing ring 130 is set on the outer circumferential surface of each of longitudinal end portions 13A and 13B of tubing 10. Upon setting fixing ring 130, notch 131 of fixing ring 130 is aligned with overlap portion 14 of tubing 10. Next, tubing 10 with fixing ring 130 is set into cavities 103 and 104 of upper and lower dies 101 and 102. Upper and lower dies 101 and 102 are then closed, and nozzles 110 are inserted into longitudinal end portions 13A and 13B. Upon inserting nozzles 110, weld overlay 16 of tubing 10 is pressed by nozzle 110 to be cut or deformed. As a result, an excess of weld overlay 16 is removed, and remaining weld overlay 16A better seals the clearance between the outer circumferential surface of nozzle 110 and the inner circumferential surface of each of longitudinal end portions 13A and 13B as shown in FIG. 8. This ensures the sealing between the outer circumferential surface of nozzle 110 and the inner circumferential surface of each of longitudinal end portions 13A and 13B.

Subsequently, pressurized fluid generating device 120 is actuated to feed pressurized fluid to each of nozzles 110. The pressurized fluid is then supplied into tubing 10 via the fluid passage of nozzle 110. At this time, if required, upper and lower dies 101 and 102 can be relatively moved, and nozzles 110 can be axially moved. Thus, tubing 10 is formed into a hydrostatic-formed article having a desired shape.

During the hydrostatic forming operation, fillet weld 15 and intervening weld junction 17 cooperate to prevent the pressurized fluid from leaking from overlap portion 14 in the longitudinal direction of tubing 10, and remaining weld overlay 16A prevents the pressurized fluid from leaking from longitudinal end portions 13A and 13B of tubing 10.

As explained above, tubing 10 for hydrostatic forming can be obtained using an inexpensive plate at cost-saving, as compared to the conventional ones. Further, overlap portion 14 of tubing 10 is welded by lap welding, and therefore, high accuracy in positioning and machining of opposite end surfaces of the plate is unnecessary unlike butt welding. Even when a thickness of the plate is small, the lap welding work can be readily performed. Further, high forming technology is not required for the formation of tubing 10 in the overlapping manner. Accordingly, decrease in whole productivity of tubing 10 and increase in cost can be suppressed by using the plate. Thus, tubing 10 can be produced at good productivity and low cost.

Figure 9:
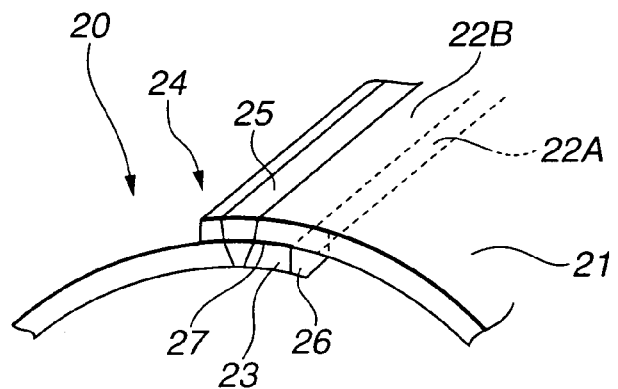
FIG. 9 is a partially enlarged view of a longitudinal end portion of a first modified tubing.

Referring to FIG. 9, there is shown a first modification of the tubing of the first embodiment, in which penetration weld 25 is formed at overlap portion 24 instead of fillet weld 15 of tubing 10 of the first embodiment. Similar to tubing 10, tubing 20 is made of a metal plate that has a uniform thickness. Tubing 20 includes inner and outer circumferential end portions 22A and 22B and overlap portion 24 formed by inner and outer circumferential end portions 22A and 22B overlapping and joined with each other. Penetration weld 25 is formed at overlap portion 24 in the longitudinal direction of tubing 20 and extends from the outer circumferential surface of outer circumferential end portion 22B to inner circumferential end portion 22A. Penetration weld 25 can prevent pressurized fluid from leaking from overlap portion 24 in the longitudinal direction of tubing 20, thereby ensuring hydrostatic forming ability of tubing 20. Tubing 20 also includes single wall portion 21 and longitudinal end portions 23 opposed to each other in the longitudinal direction of tubing 20.

Tubing 20 further includes weld overlay 26 acting as a fluid leakage preventing member for preventing the pressurized fluid supplied to tubing 20 from leaking from each of longitudinal end portions 23 upon tubing 20 being subjected to hydrostatic forming. Weld overlay 26 is formed inside each of longitudinal end portions 23 and adjacent to overlap portion 24 in a circumferential direction of tubing 20. Namely, weld overlay 26 is located at an inside step on an inner circumferential surface of tubing 20. When the nozzle of the hydrostatic forming apparatus is inserted into each of longitudinal end portions 23, weld overlay 26 is deformed or cut to seal a clearance between an inner circumferential surface of each of longitudinal end portions 23 and an outer circumferential surface of the nozzle. FIG. 9 shows weld overlay 26 disposed inside one of longitudinal end portions 23. Intervening weld junction 27 acting as a seal member is disposed in a clearance between inner and outer circumferential end portions 22A and 22B of overlap portion 24 and seals the clearance.

Figure 10:
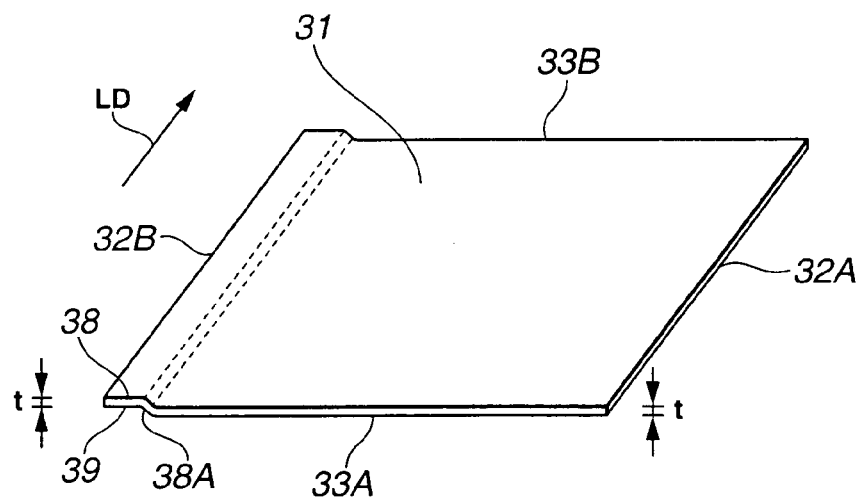
FIG. 10 is a perspective view of a plate used for forming a second modified tubing.
Figure 11:
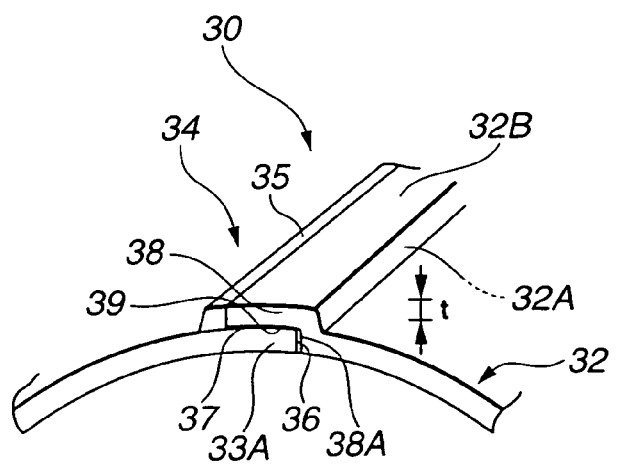
FIG. 11 is a partially enlarged view of a longitudinal end portion of the second modified tubing.

Referring to FIGS. 10–11, a second modification of the tubing of the first embodiment is explained. FIG. 10 illustrates generally rectangular-shaped metal plate 31 having uniform thickness t, and FIG. 11 illustrates tubing 30 formed of plate 31. As illustrated in FIG. 10, plate 31 has longitudinal end portions 33A and 33B opposed to each other in longitudinal direction LD of plate 31, and lateral end portions 32A and 32B opposed to each other in a lateral direction perpendicular to longitudinal direction LD. Lateral end portion 32B is bent to form step 38 that projects upwardly as shown in FIG. 10 to thereby define recess 39 behind step 38. The projection amount of step 38 corresponds with thickness t of plate 31, so that an inner circumferential surface of tubing 30 is smoothly formed without projection. Upon forming the tubular shape of tubing 30, step 38 of lateral end portion 32B is laid on lateral end portion 32A. In other words, lateral end portion 32A is brought into engagement with recess 39 of lateral end portion 32B. Subsequently, step 38 of lateral end portion 32B is joined to lateral end portion 32A by fillet weld 35. Hereinafter, lateral end portion 32A is referred to as inner circumferential end portion 32A, and lateral end portion 32B is referred to as outer circumferential end portion 32B.

As illustrated in FIG. 11, tubing 30 includes inner and outer circumferential end portions 32A and 32B and overlap portion 34 at which inner circumferential end portion 32A and outer circumferential end portion 32B overlap and are joined with each other. Fillet weld 35 is formed in a longitudinal direction of tubing 30 adjacent to step 38 of outer circumferential end portion 32B. Tubing 30 also includes single wall portion 32 and longitudinal end portions 33A and 33B opposed to each other in the longitudinal direction of tubing 30. Tubing 30 further includes weld overlay 36 acting as the fluid leakage preventing member for preventing the pressurized fluid supplied to tubing 30 from leaking from each of longitudinal end portions 33A and 33B upon tubing 30 being subjected to hydrostatic forming. When the nozzle of the hydrostatic forming apparatus is inserted into each of longitudinal end portions 33A and 33B, weld overlay 36 seals a clearance between an inner circumferential surface of each of longitudinal end portions 33A and 33B and an outer circumferential surface of the nozzle. Weld overlay 36 is formed inside each of longitudinal end portions 33A and 33B of tubing 30 and adjacent to overlap portion 34 in a circumferential direction of tubing 30. Specifically, weld overlay 36 is located in a slot defined by an end surface of inner circumferential end portion 32A and raising surface 38A of step 38 of outer circumferential end portion 32B. The size of weld overlay 36 is smaller than that of weld overlay 16 of the first embodiment. Weld overlay 36 has an inner circumferential surface substantially smoothly continued to inner circumferential surfaces of inner and outer circumferential end portions 32A and 32B. The inner circumferential surface of weld overlay 36 may be subjected to machining such that the smoothness of the inner circumferential surface of tubing 30 is enhanced. Weld overlay 36 may be formed by brazing. Similar to arc welding used in the first embodiment, brazing is preferred in view of easiness and productivity.

Intervening weld junction 37 is disposed in a clearance between an inner surface of step 38 of outer circumferential end portion 32B and an outer surface of inner circumferential end portion 32A which overlap each other. Intervening weld junction 37 acts as a sealing member for sealing the clearance. Intervening weld junction 37 cooperates with fillet weld 35 to prevent fluid leakage from overlap portion 34 in the longitudinal direction of tubing 30 upon hydrostatic forming.

As understood from the above description, the inner circumferential surface of tubing 30 is improved in smoothness. This increases lives of the nozzles of the hydrostatic forming apparatus and suppresses dispersion of chips of weld overlay 36 which are cut out upon inserting the nozzle into longitudinal end portions 33A and 33B of tubing 30.

Figure 12:
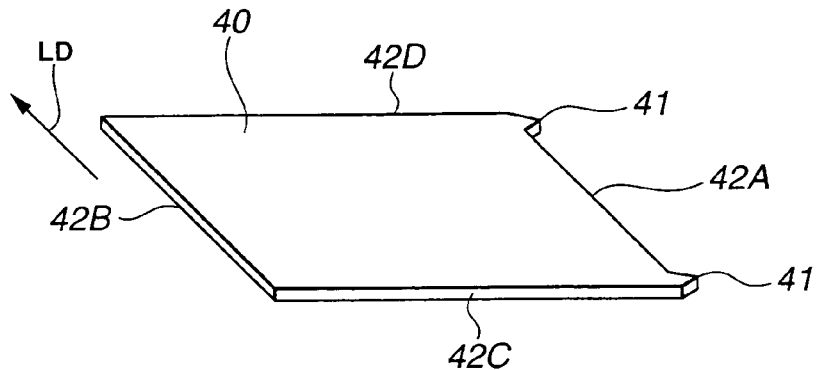
FIG. 12 is a perspective view of a plate used for forming a third modified tubing.
Figure 13:
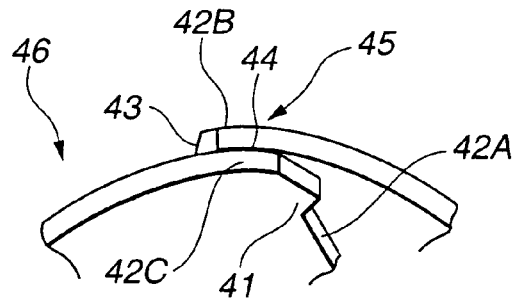
FIG. 13 is a partially enlarged view of a longitudinal end portion of the third modified tubing, showing a projection.

Referring to FIGS. 12–13, there is shown a third modification of the tubing of the first embodiment. Tubing 46 is made of generally rectangular-shaped metal plate 40 having lateral end portions 42A and 42B opposed to each other in a lateral direction perpendicular to longitudinal direction LD of plate 40. Lateral end portion 42A has at least two projections 41, 41 projecting outwardly from an end surface thereof. Each of projections 41, 41 has a triangular shape in plan view. Plate 40 is formed into a tubular shape in such a manner that lateral end portion 42B is overlaid on lateral end portion 42A with projections 41, 41. Then, lateral end portions 42A and 42B overlapping each other are joined together by lap-fillet welding to form tubing 46. Hereinafter, lateral end portion 42A is referred to as inner circumferential end portion 42A, and lateral end portion 42B is referred to as outer circumferential end portion 42B.

As illustrated in FIG. 13, tubing 46 includes inner and outer circumferential end portions 42A and 42B and overlap portion 45 formed by inner circumferential end portion 42A and outer circumferential end portion 42B overlapping and joined with each other. Projections 41, 41 of inner circumferential end portion 42A are formed at longitudinal end portions 42C and 42D of tubing 46 and extend in the circumferential direction of tubing 46. FIG. 13 shows one of projections 41, 41 which is formed at longitudinal end portion 42C. Upon inserting the nozzles of the hydrostatic forming apparatus as described above, projections 41, 41 are cut or deformed and act as the fluid leakage preventing member, similar to weld overlay 16 of tubing 10 of the first embodiment. Fillet weld 43 is formed at overlap portion 45 in the longitudinal direction of tubing 46. Specifically, fillet weld 43 extends adjacent to an end surface of outer circumferential end portion 42B in the longitudinal direction of tubing 46 over an entire length of tubing 46.

Tubing 46 further includes intervening weld junction 44 disposed in a clearance between an inner surface of outer circumferential end portion 42B and an outer surface of inner circumferential end portion 42A which are opposed to each other at overlap portion 45. Intervening weld junction 44 acts as a sealing member for sealing the clearance. Intervening weld junction 44 cooperates with fillet weld 43 to prevent fluid leakage from overlap portion 45 in the longitudinal direction of tubing 46 upon hydrostatic forming.

Figure 14:
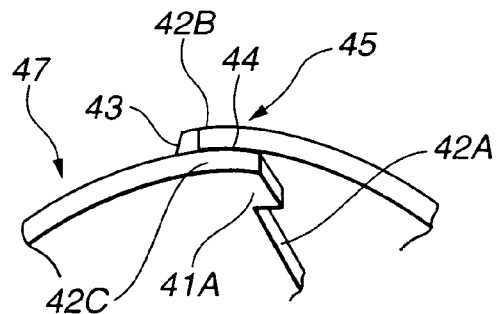
FIG. 14 is a view similar to FIG. 13, but illustrating a projection having a shape different from that of the projection of FIG. 13.
Figure 15:
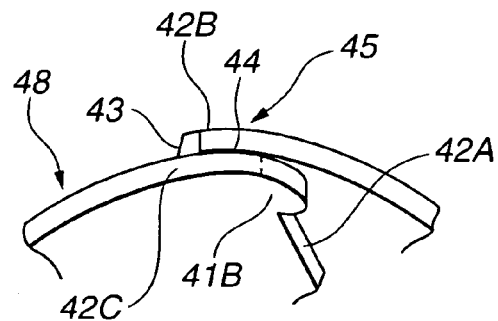
FIG. 15 is a view similar to FIG. 13, but illustrating a projection having a shape different from that of the projection of FIG. 13.

The shape of each of projections 41, 41 of inner circumferential end portion 42A is not limited to the triangular shape as shown in FIG. 13. FIG. 14 illustrates projection 41A of tubing 47 which has a generally rectangular shape. Projection 41A may be formed into other polygonal shapes. FIG. 15 illustrates projection 41B of tubing 48 which has a generally circular shape.

Figure 16:
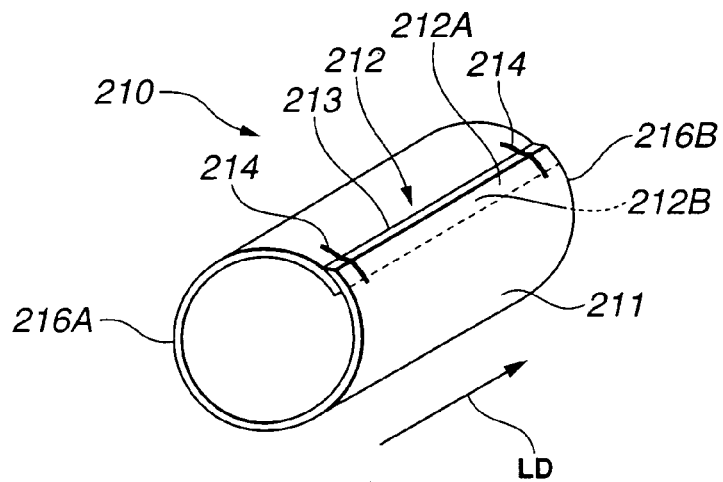
FIG. 16 is a view similar to FIG. 1, but illustrating a tubing according to a second embodiment of the present invention.

Referring to FIGS. 16–21, there is shown a second embodiment of the tubing for hydrostatic forming, according to the present invention. As illustrated in FIG. 16, tubing 210 includes outer circumferential end portion 212A and inner circumferential end portion 212B, and overlap portion 212 formed by outer and inner circumferential end portions 212A and 212B overlapping and joined with each other. Tubing 210 is made of a metal plate and formed by lap-fillet welding as explained in the first embodiment.

Fillet weld 213 is formed at overlap portion 212 in longitudinal direction LD of tubing 210. Specifically, fillet weld 213 extends adjacent to an end surface of outer circumferential end portion 212A in longitudinal direction LD of tubing 210 over an entire length of tubing 210. Fillet weld 213 prevents the pressurized fluid supplied into tubing 210 from leaking from overlap portion 212 in longitudinal direction LD of tubing 210 upon tubing 210 being subjected to hydrostatic forming. The method of welding overlap portion 212 is not limited to the lap-fillet welding, and other welding methods may be selected if there occurs no hole or clearance causing fluid leakage in the longitudinal direction of tubing 210. Upon forming the plate into tubing 210, the lap-fillet welding can be performed by positioning and machining of end surfaces of the lateral end portions of the plate without high accuracy, unlike butt welding. Further, the lap-fillet welding can be readily performed even in the case of using a plate having a relatively small thickness. Further, the manner of forming the tubular shape of tubing 210 by overlaying one of the lateral end portions of the plate on the other thereof is simple and can be achieved without high forming technology.

Tubing 210 also includes single wall portion 211 and longitudinal end portions 216A and 216B opposed to each other in longitudinal direction LD of tubing 210. Tubing 210 further includes penetration weld 214 acting as a fluid leakage preventing member for preventing the pressurized fluid supplied to tubing 210 from leaking from each of longitudinal end portions 216A and 216B upon tubing 210 being subjected to hydrostatic forming. Upon hydrostatic forming with the hydrostatic forming apparatus as explained in the first embodiment, penetration weld 214 seals a clearance between an inner circumferential surface of each of longitudinal end portions 216A and 216B and an outer circumferential surface of the nozzle inserted into each of longitudinal end portions 216A and 216B.

Figure 17:
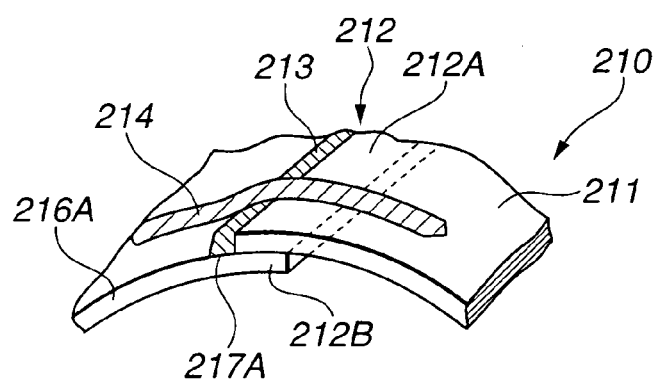
FIG. 17 is a partially enlarged view of a longitudinal end portion of the tubing shown in FIG. 16, showing an outer surface of the longitudinal end portion.
Figure 18:
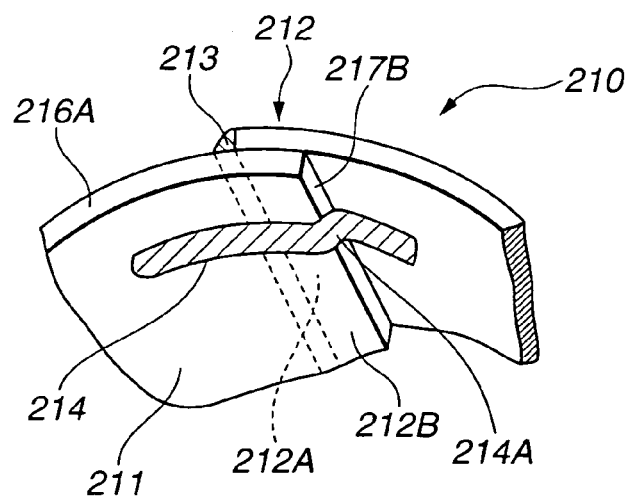
FIG. 18 is a view similar to FIG. 17, but illustrating an inner surface of the longitudinal end portion.

Specifically, tubing 210 includes outside step 217A on an outer circumferential surface thereof as shown in FIG. 17, and inside step 217B on an inner circumferential surface thereof as shown in FIG. 18. Penetration weld 214 is formed in a predetermined region extending through overlap portion 212 and inside step 217B along a circumferential direction of tubing 210. Specifically, penetration weld 214 extends through overlap portion 212 and inside step 217B to both sides of overlap portion 212 in the circumferential direction of tubing 210. As illustrated in FIG. 18, penetration weld 214 has inner circumferential surface 214A smoothly continued to both of inner surfaces of outer and inner circumferential end portions 212A and 212B. Inner circumferential surface 214A is configured to eliminate inside step 217B of the inner circumferential surface of tubing 210. Penetration weld 214 is formed by laser beam welding applied along the circumferential direction of tubing 210 from the outer circumferential surface thereof.

With the provision of penetration weld 214 having smooth inner circumferential surface 214A, sealing between the outer circumferential surfaces of the nozzles of the hydrostatic forming apparatus and the inner circumferential surfaces of longitudinal end portions 216A and 216B of tubing 210 can be enhanced. Further, penetration weld 214 is formed within a limited region extending inwardly from an end surface of each of longitudinal end portions 216A and 216B such that inner circumferential surface 214A can be contacted with the outer circumferential surface of the nozzle when the nozzle is inserted into longitudinal end portions 216A and 216B of tubing 210. Therefore, as illustrated in FIGS. 17–18, penetration weld 214 may be located distant from an end surface of each of longitudinal end portions 216A and 216B of tubing 210 within the above limited region. Similar to the first embodiment, this embodiment can serve for increasing productivity of the tubing.

Figure 19:
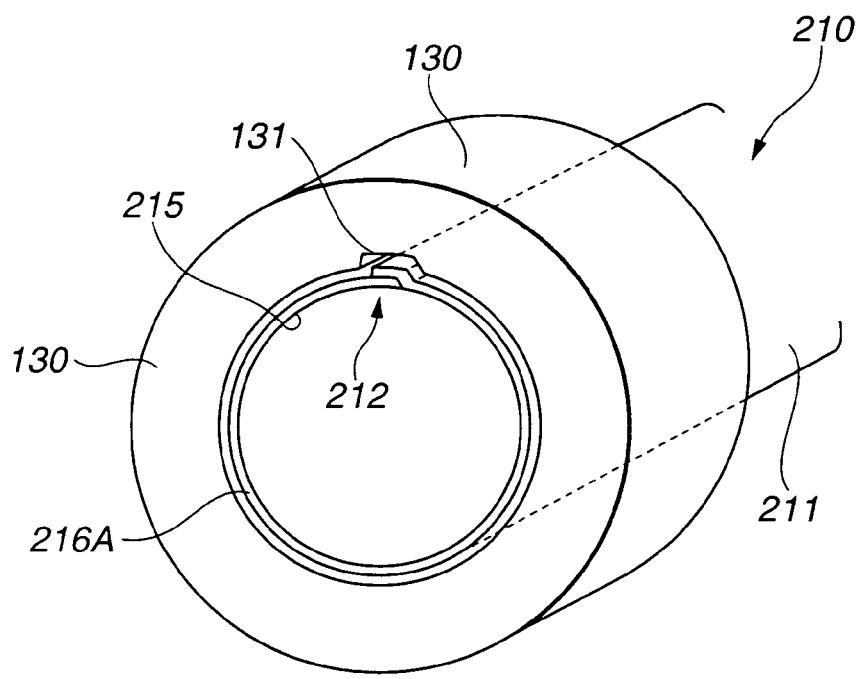
FIG. 19 is a view similar to FIG. 6, but illustrating the fixing ring set on the tubing of the second embodiment.
Figure 20:
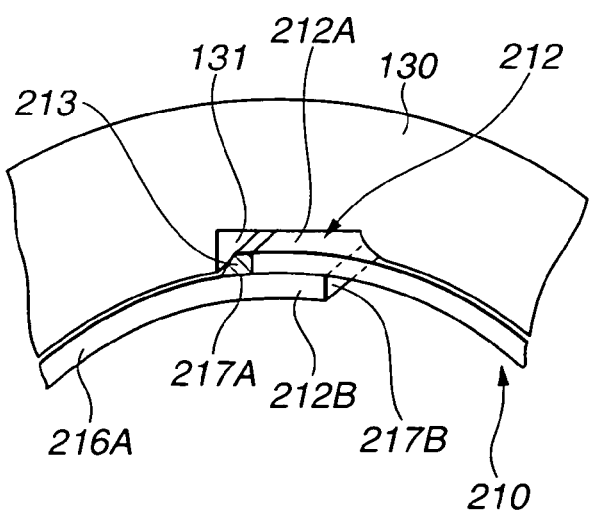
FIG. 20 is a partially enlarged view of FIG. 19.
Figure 21:
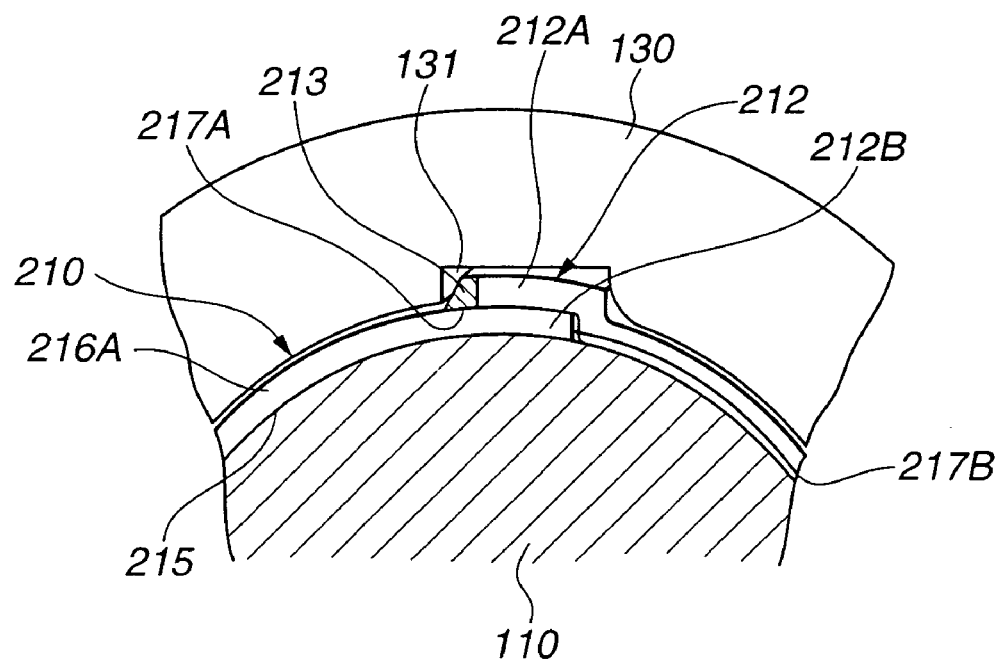
FIG. 21 is a partially enlarged cross section of the pressurized fluid supplying nozzle of FIG. 5 inserted into the tubing of the second embodiment.

Tubing 210 is formed into a hydrostatic-formed article having a desired shape by the method using the hydrostatic forming apparatus as explained in the first embodiment. FIG. 19 illustrates only one of fixing rings 130 of the hydrostatic forming apparatus which are set to longitudinal end portions 216A and 216B of tubing 210. As shown in FIG. 20, overlap portion 212 of tubing 210 is engaged in notch 131 of fixing ring 130. As shown in FIG. 21, upon inserting nozzle 110 into longitudinal end portion 216A of tubing 210 through opening 215, outer circumferential end portion 212A is pressed between nozzle 110 and fixing ring 130 and brought into an inwardly bent state. Inner circumferential surface 214A of penetration weld 214 is deformed or cut by nozzle 110 so that a clearance between the outer circumferential surface of nozzle 110 and the inner circumferential surface of each of longitudinal end portions 216A and 216B of tubing 210 is sealed. Thus, sealing between the outer circumferential surface of nozzle 110 and the inner circumferential surface of each of longitudinal end portions 216A and 216B of tubing 210 can be enhanced.

Figure 22:
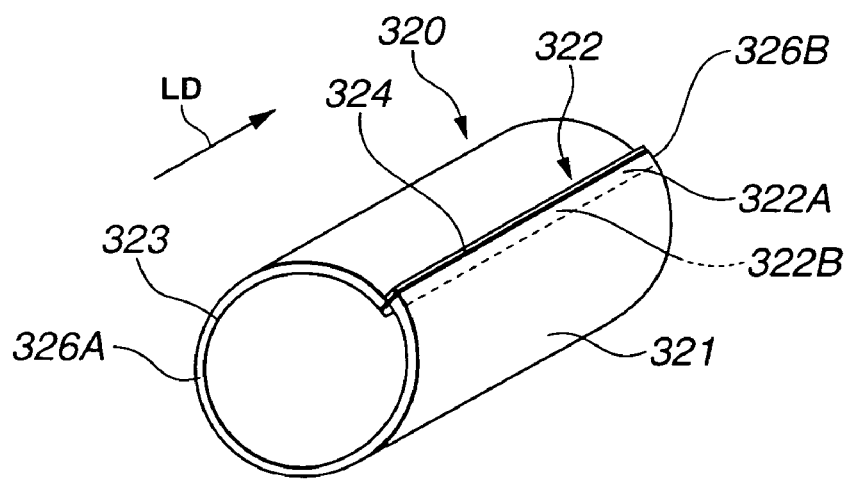
FIG. 22 is a view similar to FIG. 1, but illustrating a modification of the tubing of the second embodiment.
Figure 23:
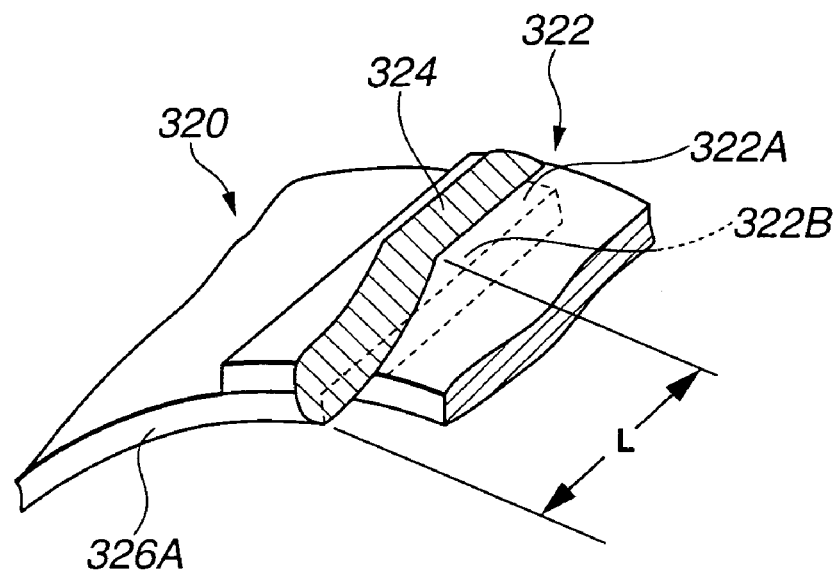
FIG. 23 is a partially enlarged view of a longitudinal end portion of the tubing shown in FIG. 22, showing an outer surface of the longitudinal end portion.
Figure 24:
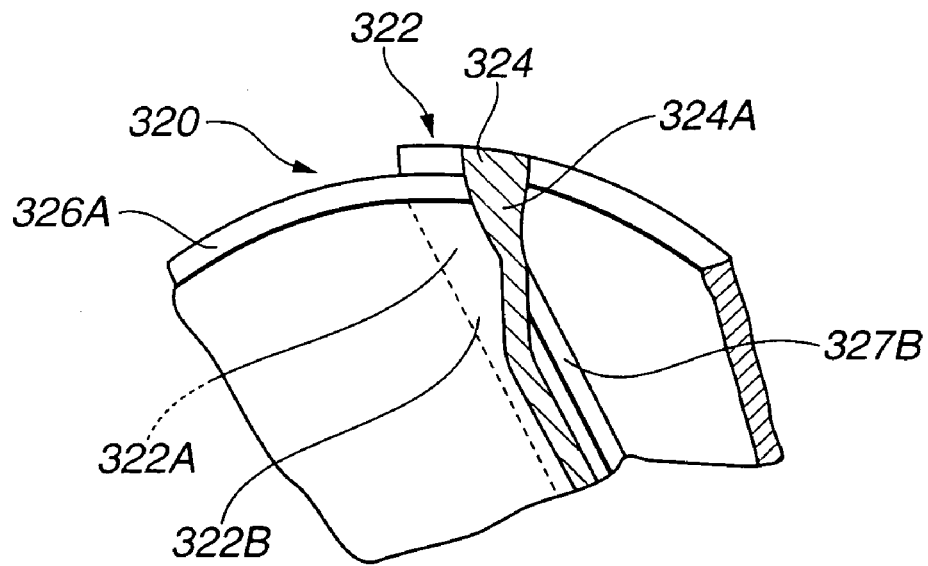
FIG. 24 is a partially enlarged view of a longitudinal end portion of the tubing shown in FIG. 22, showing an inner surface of the longitudinal end portion.

Referring to FIGS. 22–24, there is shown a modification of the tubing of the second embodiment. As illustrated in FIG. 22, tubing 320 includes outer circumferential end portion 322A and inner circumferential end portion 322B, and overlap portion 322 formed by outer and inner circumferential end portions 322A and 322B overlapping and joined with each other. Tubing 320 is made of a metal plate as explained in the first embodiment. Outer and inner circumferential end portions 322A and 322B of overlap portion 322 are joined together by penetration welding. Penetration weld 324 is formed at overlap portion 322 over an entire length in longitudinal direction LD of tubing 320. Penetration weld 324 is formed by laser beam welding applied along longitudinal direction LD of tubing 320 from the outer circumferential surface thereof.

Tubing 320 also includes single wall portion 321 and longitudinal end portions 326A and 326B opposed to each other in longitudinal direction LD of tubing 320. Penetration weld 324 includes opposite end portions each extending by predetermined length L from the respective end surfaces of longitudinal end portions 326A and 326B of tubing 320 in longitudinal direction LD, and the remaining portion extending between the opposite end portions. The remaining portion of penetration weld 324 straightly extends within a region of overlap portion 322 of tubing 320. Each of the opposite end portions of penetration weld 324 acts as a fluid leakage preventing member for preventing the pressurized fluid supplied to tubing 320 from leaking from each of longitudinal end portions 326A and 326B upon tubing 320 being subjected to hydrostatic forming.

FIGS. 23–24 show only one of the opposite end portions of penetration weld 324 which is located at longitudinal end portion 326A of tubing 320. Each of the opposite end portions of penetration weld 324 has inner surface 324A shown in FIG. 24, which extends over predetermined length L. Inner surface 324A is smoothly continued to inner surfaces of outer and inner circumferential end portions 322A and 322B of tubing 320. Inner surface 324A is configured to eliminate inside step 327B on an inner circumferential surface of tubing 320. Namely, inner surface 324A is a sloped surface having a predetermined inclination relative to an end surface of inner circumferential end portion 322B which forms inside step 327B.

Upon forming penetration weld 324, the opposite end portions of penetration weld 324 are formed corresponding to inside step 327B with high accuracy, but the remaining portion between the opposite end portions thereof is formed with relatively low accuracy. Further, outer and inner circumferential end portions 322A and 322B of overlap portion 322 can be joined with each other by penetration welding once. This serves for considerably reducing the number of production steps and the production time and cost.

Tubing 320 may be formed into a hydrostatic-formed article having a desired shape by the method using the hydrostatic forming apparatus as explained in the first embodiment. Upon inserting nozzle 110 into each of longitudinal end portions 326A and 326B of tubing 320, inner surface 324A of each of the opposite end portions of penetration weld 324 is deformed or cut by nozzle 110 and seals a clearance between the outer circumferential surface of nozzle 110 and an inner circumferential surface of each of longitudinal end portions 326A and 326B. Thus, each of the opposite end portions of penetration weld 324 prevents the pressurized fluid supplied into tubing 320 from leaking from the clearance.

The tubing of the present invention is not limited to those of the embodiments and modifications thereof as explained above. The welding of the overlap portion of the tubing is not limited to the lap-fillet welding and the penetration welding and may be seam welding.

Figure 25:
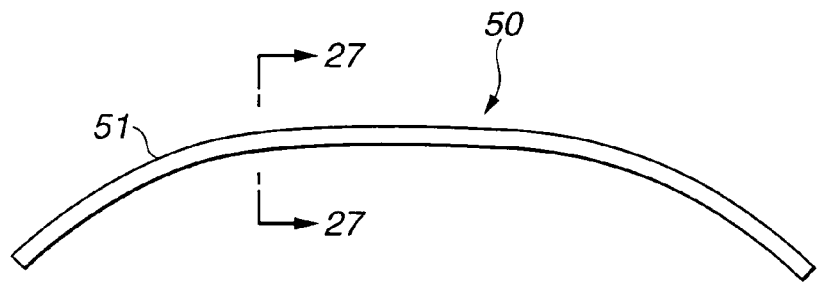
FIG. 25 is a side view of a structural member for automobiles according to a third embodiment of the present invention.
Figure 26:
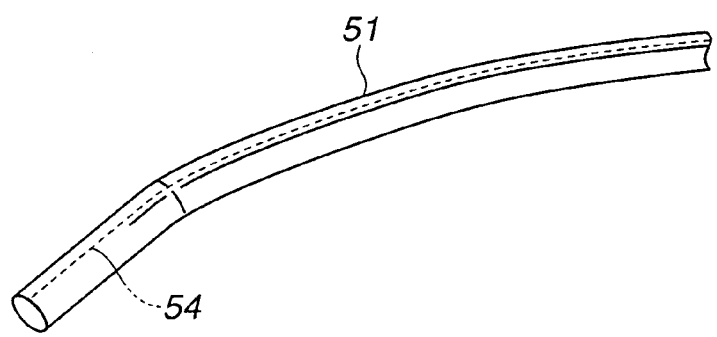
FIG. 26 is a partially enlarged view of the structural member shown in FIG. 25.
Figure 27:
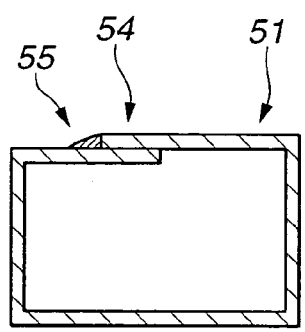
FIG. 27 is a sectional view of the structural member, taken along line 27—27 of FIG. 25.

Referring to FIGS. 25–27, there is shown a structural member for automobiles according to a third embodiment of the present invention. In this embodiment, the structural member is a center roof rail. As illustrated in FIG. 25, center roof rail 50 includes tubular portion 51. Tubular portion 51 is formed by subjecting tubing 10 of the first embodiment to press forming to form a bent tube, and then subjecting the bent tube to hydrostatic forming to form center roof rail 50. The hydrostatic forming apparatus as explained in the first embodiment can be applied upon the hydrostatic forming. Tubular portion 51 has a generally rectangular cross section as shown in FIG. 27. Tubular portion 51 includes overlap portion 54 at which end portions overlap each other and are joined by fillet weld 55. Tubing 10 has a low cost and good productivity as explained above, and therefore, center roof rail 50 formed from tubing 10 is excellent in cost-saving and productivity. The tubings of the above-described embodiment and modifications can be applied to the structural member for automobiles. Further, the structural member for automobiles is not limited to this embodiment, and may be other structural members, for instance, reinforcing member, for automobiles.

Figure 28:
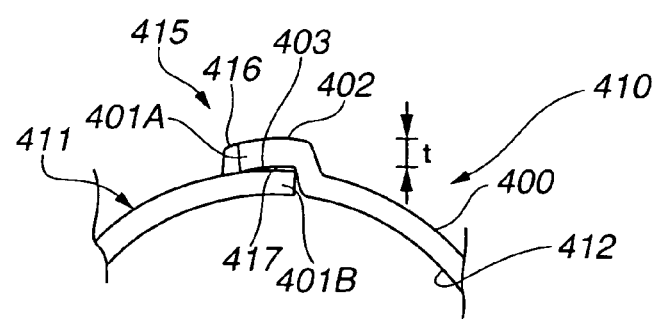
FIG. 28 is a partially enlarged view of a longitudinal end portion of a tubing.

Referring to FIGS. 28–32, an apparatus and method for hydrostatic forming of a tubing, according to a fourth embodiment of the present invention, will be explained hereinafter. FIG. 28 illustrates tubing 410 that is subjected to hydrostatic forming using the hydrostatic forming apparatus as explained later. As illustrated in FIG. 28, tubing 410 includes outer circumferential end portion 401A, inner circumferential end portion 401B, and overlap portion 415 formed by outer and inner circumferential end portions 401A and 401B overlapping and joined with each other. Tubing 410 further includes single wall portion 400 and longitudinal end portions 411 opposed to each other in a longitudinal direction of tubing 410, only one of which is shown in FIG. 28. Similar to the second modification of the tubing of the first embodiment, tubing 410 is made of a metal plate, and outer and inner circumferential end portions 401A and 401B are welded, for instance, by lap-fillet welding.

Specifically, outer circumferential end portion 401A of tubing 410 is formed with step 402 that projects upwardly as shown in FIG. 28, and recess 403 defined by step 402. The projection amount of step 402 corresponds to thickness t of the plate, namely, the thickness of single wall portion 400. Step 402 of outer circumferential end portion 401A is overlaid on inner circumferential end portion 401B. In other words, inner circumferential end portion 401B is brought into engagement with recess 403 of outer circumferential end portion 401A. Therefore, overlap portion 415 has a radially outwardly projecting shape in cross section, and an outer circumferential surface of tubing 410 has a projection at overlap portion 415. In contrast, an inner circumferential surface of tubing 410 is smoothly formed without projection. Weld 416 is formed in the longitudinal direction of tubing 410 adjacent to step 402 of outer circumferential end portion 401A. There exists clearance 417 between outer and inner circumferential end portions 401A and 401B along the longitudinal direction of tubing 410. At each of longitudinal end portions 411 of tubing 410, clearance 417 is not sealed by any sealing member such as weld.

Figure 29:
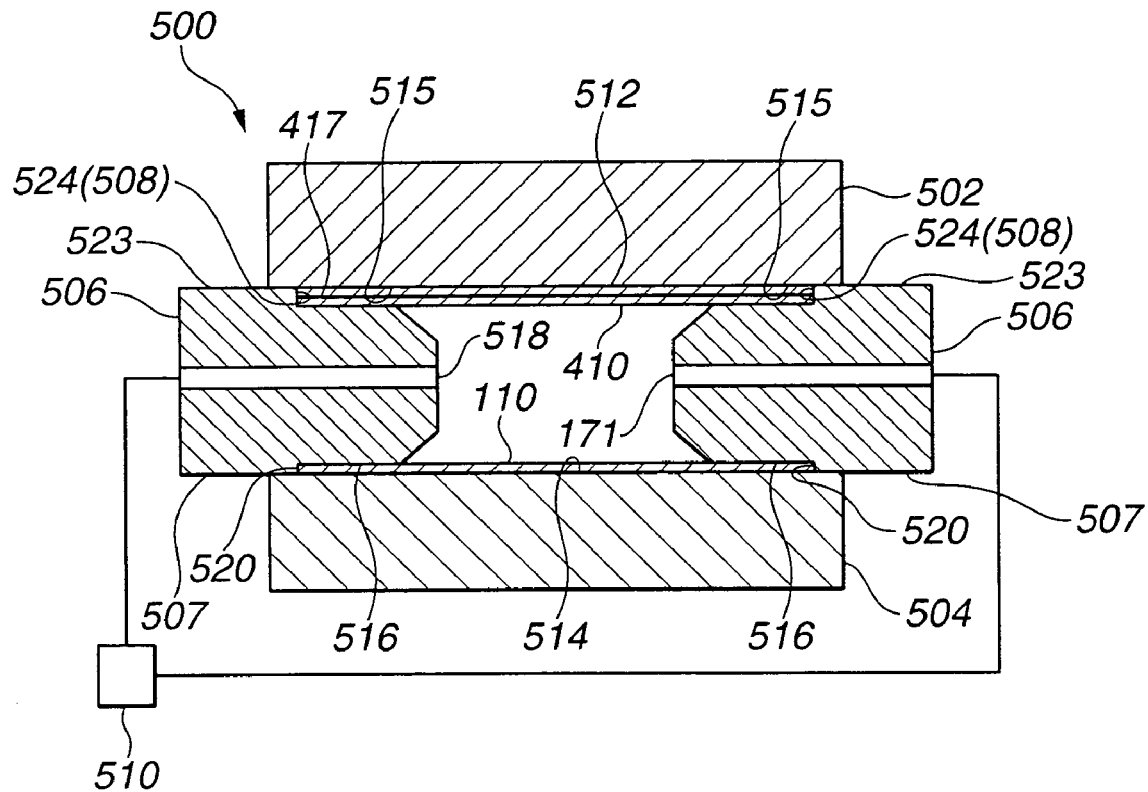
FIG. 29 is a cross section of a hydrostatic forming apparatus according to a fourth embodiment of the present invention, in which the tubing shown in FIG. 28 is set.

As illustrated in FIG. 29, hydrostatic forming apparatus 500 of the fourth embodiment includes a die constituted of upper die 502 and lower die 504, two nozzles 506 for supplying pressurized fluid, and pressurized fluid generating device 510. Upper die 502 and lower die 504 have cavities 512 and 514, respectively, in which tubing 410 is set. Upper die 502 and lower die 504 are arranged to be relatively moveable close to and away from each other. Upper die 502 and lower die 504 cooperate to clamp and form tubing 410 into a desired shape. Two nozzles 506 are arranged spaced from each other on the outside of upper and lower dies 502 and 504. Two nozzles 506 are relatively moveable in an axial direction thereof.

Upper die 502 includes recess 515 for receiving overlap portion 415 of tubing 410. Recess 515 is radially recessed from an inner circumferential surface of upper die 502. Recess 515 has a cross section shaped to correspond to the radially outwardly projecting shape of a cross section of overlap portion 415 of tubing 410. Recess 515 has a depth substantially same as the projecting amount of step 402 of outer circumferential end portion 401A of tubing 410, i.e., thickness t of the plate forming single wall portion 400 of tubing 410. Recess 515 facilitates positioning of tubing 410 when tubing 410 is set to the die, serving for increasing productivity.

Each of nozzles 506 is inserted into opening 412 of each of longitudinal end portions 411 of tubing 410 and pressed on longitudinal end portion 411 thereof. Longitudinal end portion 411 is deformed by small-diameter portion 516 of nozzle 506 inserted, and upper and lower dies 502 and 504. Therefore, even when a cross-sectional shape of longitudinal end portion 411 is distorted or non-uniform, longitudinal end portion 411 is forcedly deformed into the same cross-sectional shape as that of small-diameter portion 516. High degree of accuracy in shape of longitudinal end portion 411 of tubing 410 is unnecessary.

Figure 30:
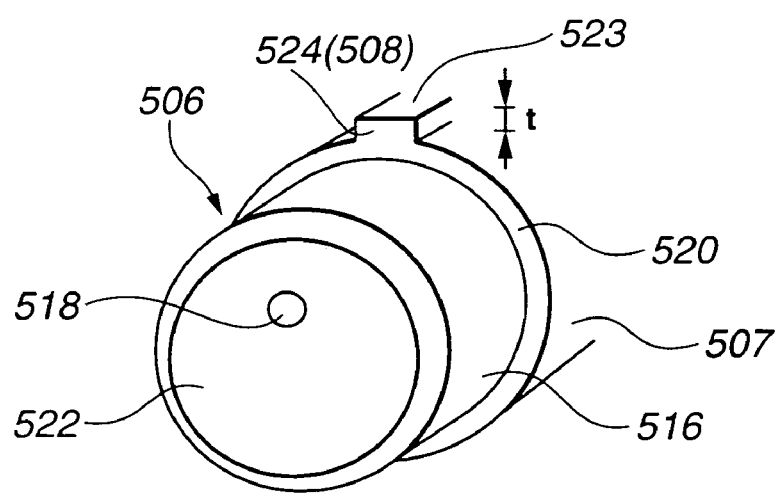
FIG. 30 is an enlarged perspective view of a pressurized fluid supplying nozzle of the hydrostatic forming apparatus shown in FIG. 29.

As illustrated in FIG. 30, each of nozzle 506 has a generally cylindrical shape and includes large-diameter portion 507, small-diameter portion 516 disposed axially adjacent to large-diameter portion 507, and a tapered end portion connected with small-diameter portion 516. A fluid passage extends through nozzle 506 and opens to end surface 522 of the tapered end portion. As shown in FIG. 29, nozzle 506 is connected to pressurized fluid generating device 510. Pressurized fluid is fed from pressurized fluid generating device 510 to nozzle 506 and then supplied into tubing 410 through opening 518 of the fluid passage of nozzle 506.

Nozzle 506 includes fluid leakage preventing member 508 for preventing the pressurized fluid supplied into tubing 410 from leaking from clearance 417 between outer and inner circumferential end portions 401A and 401B of overlap portion 415 at longitudinal end portions 411 of tubing 410. Fluid leakage preventing member 508 is seal surface 524 formed by a part of a peripheral end surface of large-diameter portion 507. Seal surface 524 radially extends and comes into contact with an end surface of overlap portion 415 of tubing 410 which is located in the longitudinal direction of tubing 410. Seal surface 524 has a substantially same shape as the end surface of overlap portion 415 of tubing 410 so as to seal clearance 417 between outer and inner circumferential end portions 401A and 401B of overlap portion 415 at longitudinal end portions 411 of tubing 410.

Specifically, projection 523 radially outwardly projects from an outer circumferential surface of large-diameter portion 507 and extends in the axial direction of nozzle 506. Projection 523 has an axial end surface connected with a radially extending peripheral end surface of large-diameter portion 507 which forms a shoulder portion between large-diameter portion 507 and small-diameter portion 516. Seal surface 524 is located on the axial end surface of projection 523. Seal surface 524 has a cross section having a radially outwardly projecting shape corresponding to a cross section of overlap portion 415 of tubing 410. When each of nozzles 506 is inserted into longitudinal end portion 411 of tubing 410 upon hydrostatic forming, seal surface 524 is pressed on the end surface of overlap portion 415 of tubing 410 which is located in an opposed relation to seal surface 524 in the longitudinal direction of tubing 410. Seal surface 524 covers an entire area of the end surface of overlap portion 415 to thereby suppress fluid leakage from clearance 417 between outer and inner circumferential end portions 401A and 401B of overlap portion 415.

Large-diameter portion 507 of nozzle 506 further includes butting surface 520 brought into contact with end surface 400A of single wall portion 400 of tubing 410. Butting surface 520 is located on the radially extending peripheral end surface of large-diameter portion 507. When each of nozzles 506 is inserted into longitudinal end portion 411 of tubing 410 upon hydrostatic forming, butting surface 520 is pressed on end surface 400A of single wall portion 400 of tubing 410 which is located in an opposed relation to butting surface 520 in the longitudinal direction of tubing 410. Butting surface 520 covers an entire area thereof to thereby suppress fluid leakage therefrom. Butting surface 520 and seal surface 524 cooperate with each other to prevent the pressurized fluid supplied into tubing 410 from leaking from longitudinal end portions 411 of tubing 410 upon hydrostatic forming as a whole.

Figure 31:
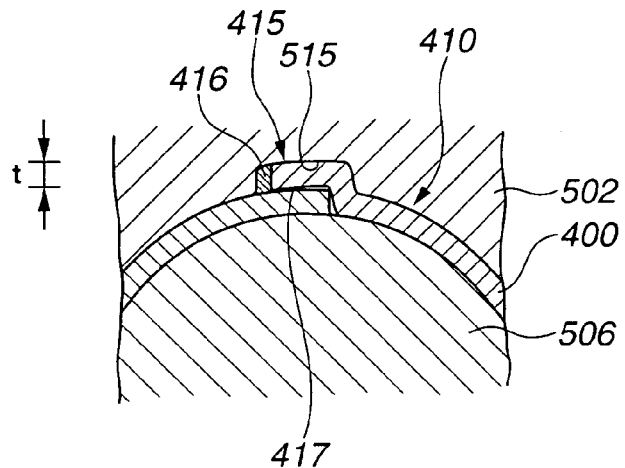
FIG. 31 is an enlarged cross section of a die of the hydrostatic forming apparatus of the fourth embodiment, the tubing of FIG. 28 set in the die, and the pressurized fluid supplying nozzle of FIG. 30 inserted into the tubing.

During the hydrostatic forming operation, sealing between the inner circumferential surface of tubing 410 and the outer circumferential surface of small-diameter portion 516 of nozzle 506 can be ensured as shown in FIG. 31. Accordingly, pressing force of nozzle 506 can be limited to a minimum value sufficient to suppress fluid leakage. This achieves easy control of the pressing force of nozzle 506 depending upon the hydrostatic forming conditions, serving for increasing productivity. As is understood from the above description, hydrostatic forming apparatus 500 can provide a hydrostatic-formed article using tubing 410 having clearance 417 at overlap portion 415, without fluid leakage from tubing 410. Accordingly, hydrostatic forming apparatus 500 can reduce the production cost and increase the productivity.

Figure 32:
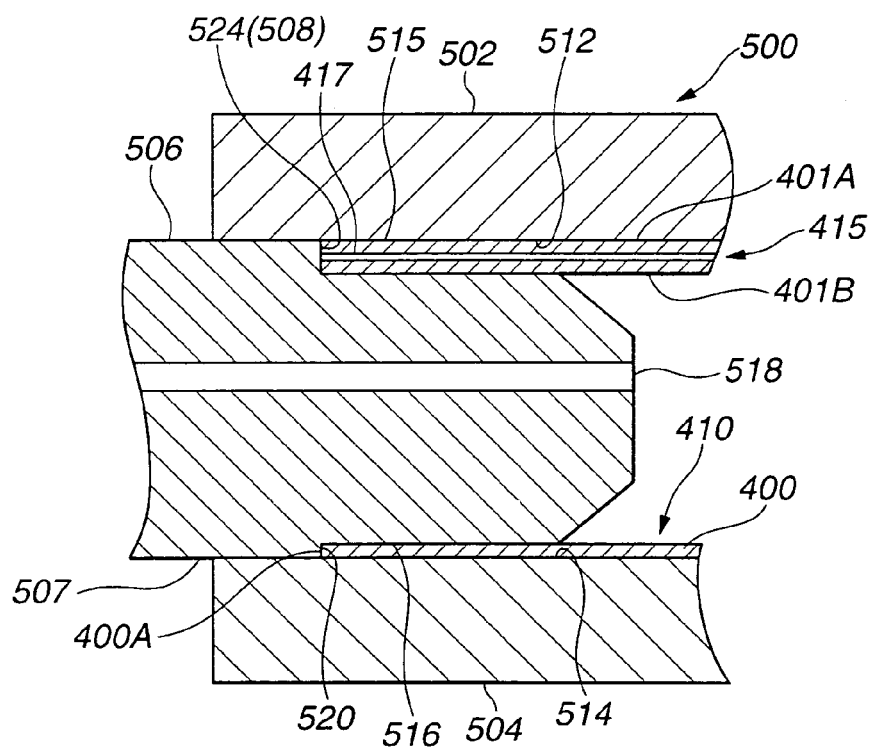
FIG. 32 is an explanatory diagram illustrating a hydrostatic forming method using the hydrostatic forming apparatus of the fourth embodiment.

The method of hydrostatic forming of tubing 410 using hydrostatic forming apparatus 500 is explained. As illustrated in FIG. 32, tubing 410 is set into cavities 512 and 514 of upper and lower dies 502 and 504. At this time, positioning of tubing 410 is performed by engaging overlap portion 415 of tubing 410 in recess 512 of upper die 502. Subsequently, upper and lower dies 502 and 504 are closed to clamp tubing 410. Nozzles 506 are axially moved and inserted into longitudinal end portions 411 of tubing 410 until seal surface 524 of each of nozzles 506 is pressed on the end surface of overlap portion 415 of tubing 410 to be in contact therewith, and at the same time, butting surface 520 of each of nozzles 506 is pressed on end surface 400A of single wall portion 400 of tubing 410 to be in contact therewith. In this state, clearance 417 between outer and inner circumferential end portions 401A and 401B of overlap portion 415 at each of longitudinal end portions 411 of tubing 410 is sealed. Pressing force of nozzle 506 can be limited to a minimum value sufficient to suppress fluid leakage. This can easily control the pressing force of nozzle 506 depending upon the hydrostatic forming conditions.

Subsequently, pressurized fluid generating device 510 is actuated to feed pressurized fluid to each of nozzles 506. The pressurized fluid is then supplied into tubing 410 via the fluid passage of nozzle 506. If required, upper and lower dies 502 and 504 can be relatively moved, and nozzles 506 can be axially moved. Thus, tubing 410 is formed into a hydrostatic-formed article having a desired shape.

As is understood from the above description, the method for hydrostatic forming of tubing 410 using hydrostatic forming apparatus 500 can reduce the production cost and increase the productivity.

Figure 33:
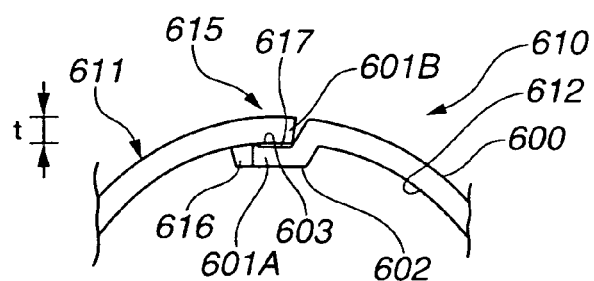
FIG. 33 is a partially enlarged view of a longitudinal end portion of a tubing.
Figure 34:
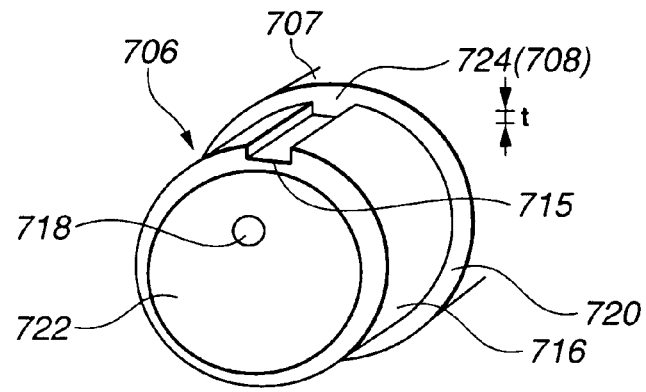
FIG. 34 is an enlarged perspective view of a pressurized fluid supplying nozzle of a hydrostatic forming apparatus according to a fifth embodiment of the present invention.
Figure 35:
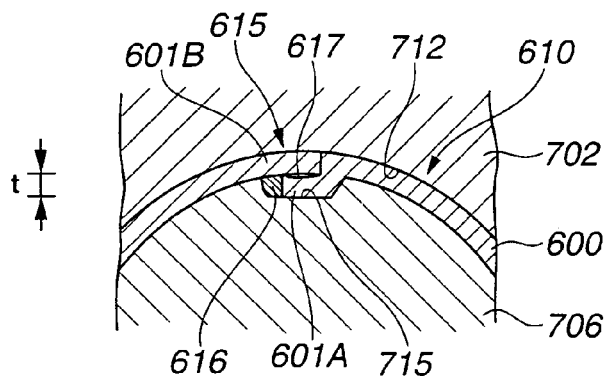
FIG. 35 is an enlarged cross section of a die of the hydrostatic forming apparatus of the fifth embodiment, the tubing of FIG. 33 set in the die, and the pressurized fluid supplying nozzle of FIG. 34 inserted into the tubing.

Referring to FIGS. 33–35, an apparatus and method for hydrostatic forming of a tubing, according to a fifth embodiment of the present invention, will be explained hereinafter. FIG. 33 illustrates tubing 610 differing in overlap portion 615 from tubing 410 shown in FIG. 28. As illustrated in FIG. 33, tubing 610 includes inner circumferential end portion 601A, outer circumferential end portion 601B, and overlap portion 615 formed by inner and outer circumferential end portions 601A and 601B overlapping and joined with each other. Tubing 610 further includes single wall portion 600 and longitudinal end portions 611 opposed to each other in a longitudinal direction of tubing 610, only one of which is shown in FIG. 33.

Specifically, inner circumferential end portion 601A of tubing 610 is formed with step 602 that projects inwardly as shown in FIG. 33, and recess 603 defined by step 602. The projection amount of step 602 corresponds to thickness t of a plate forming tubing 610, namely, the thickness of single wall portion 600. Outer circumferential end portion 601B is overlaid on step 602 of inner circumferential end portion 601A. In other words, outer circumferential end portion 601B is brought into engagement with recess 603 of inner circumferential end portion 601A. Therefore, overlap portion 615 has a radially inwardly projecting shape in cross section, and an inner circumferential surface of tubing 610 has a projection at overlap portion 615. On the other hand, an outer circumferential surface of tubing 610 is smoothly formed without projection. Weld 616 is formed in the longitudinal direction of tubing 610 adjacent to step 602 of inner circumferential end portion 601A. There exists clearance 617 between inner and outer circumferential end portions 601A and 601B along the longitudinal direction of tubing 610. At each of longitudinal end portions 611 of tubing 610, clearance 617 is not sealed by any sealing member such as weld.

Figure 36:
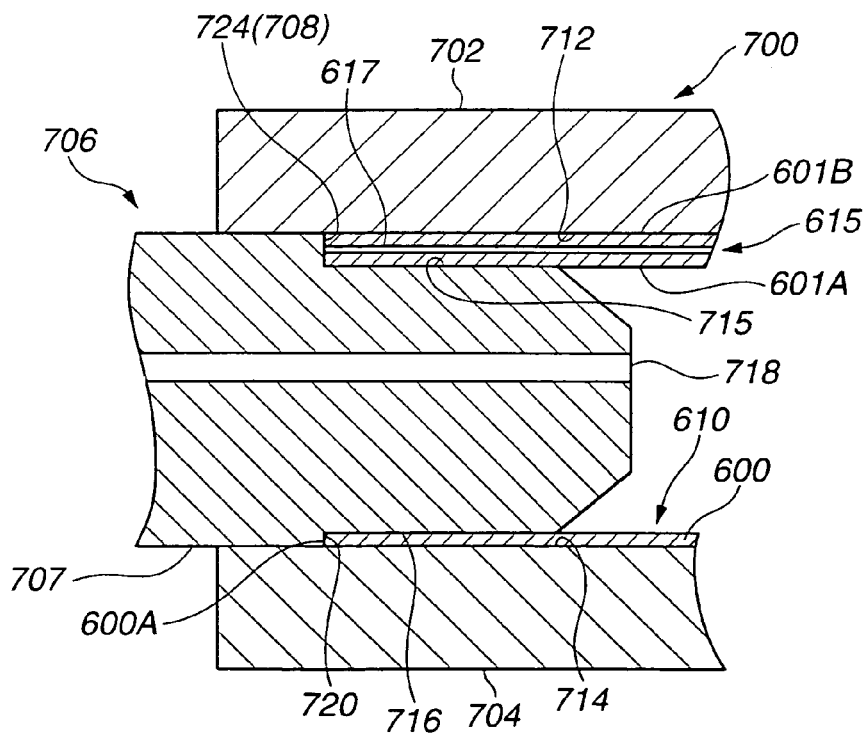
FIG. 36 is an explanatory diagram illustrating a hydrostatic forming method using the hydrostatic forming apparatus of the fifth embodiment.

The hydrostatic forming apparatus of the fifth embodiment will be explained hereinafter. The hydrostatic forming apparatus of the fifth embodiment differs in the structure of the nozzles and the die from hydrostatic forming apparatus 500 shown in FIG. 29, of the fourth embodiment. As illustrated in FIG. 36, hydrostatic forming apparatus 700 of the fifth embodiment includes a die constituted of upper die 702 and lower die 704, and nozzle 706 for supplying pressurized fluid into tubing 610. Although FIG. 36 shows one nozzle 706, two nozzles 706 are arranged spaced from each other on the outside of upper and lower dies 702 and 704 and relatively moveable in an axial direction thereof. Upper die 702 and lower die 704 have cavities 712 and 714, respectively, in which tubing 610 is set. Upper die 702 and lower die 704 are arranged to be relatively moveable close to and away from each other. Upper die 702 and lower die 704 cooperate to clamp and form tubing 610 into a desired shape. Upper die 702 has no recess for receiving overlap portion 615 of tubing 610. Upper die 702, therefore, has a simple structure, as compared to upper die 502 of the fourth embodiment.

As illustrated in FIG. 34, each of nozzle 706 has a generally cylindrical shape and includes large-diameter portion 707, small-diameter portion 716 disposed axially adjacent to large-diameter portion 707, and a tapered end portion connected with small-diameter portion 716. A fluid passage extends through nozzle 706 and opens to end surface 722 of the tapered end portion. Nozzle 706 supplies the pressurized fluid fed from the pressurized fluid generating device into tubing 610 through opening 718 of the fluid passage. Nozzle 706 includes fluid leakage preventing member 708 for preventing the pressurized fluid supplied into tubing 610 from leaking from clearance 617 between inner and outer circumferential end portions 601A and 601B of overlap portion 615 at longitudinal end portions 611 of tubing 610. Fluid leakage preventing member 708 is seal surface 724 formed by a part of a peripheral end surface of large-diameter portion 707. Seal surface 724 radially extends and comes into contact with an end surface of overlap portion 615 of tubing 610 which is located in the longitudinal direction of tubing 610. Seal surface 724 has a substantially same shape as the end surface of overlap portion 615 of tubing 610 so as to seal clearance 617 between inner and outer circumferential end portions 601A and 601B of overlap portion 615 at longitudinal end portions 611 of tubing 610.

Seal surface 724 is defined by recess 715 formed on small-diameter portion 716 of nozzle 706. Specifically, recess 715 is provided for receiving overlap portion 615 of tubing 610 upon nozzle 706 being inserted into longitudinal end portions 611 of tubing 610. Recess 715 is radially inwardly recessed from an outer circumferential surface of small-diameter portion 716. Recess 715 extends over an entire length of small-diameter portion 716 in the axial direction of nozzle 706. Recess 715 is opposed to a radially extending peripheral end surface of large-diameter portion 707 which forms a shoulder portion between large-diameter portion 707 and small-diameter portion 716. Recess 715 has a cross section shaped to correspond to a cross section of overlap portion 615 of tubing 610. Recess 715 has a depth substantially same as thickness t of the plate forming tubing 610, namely, the thickness of single wall portion 600. When each of nozzles 706 is inserted into longitudinal end portion 611 of tubing 610 upon hydrostatic forming, seal surface 724 is pressed on the end surface of overlap portion 615 of tubing 610 which is located in an opposed relation to seal surface 724 in the longitudinal direction of tubing 610. Seal surface 724 covers an entire area of overlap portion 615 to thereby suppress fluid leakage from clearance 617 between inner and outer circumferential end portions 601A and 601B of overlap portion 615.

Large-diameter portion 707 of nozzle 706 further includes butting surface 720 that is brought into contact with end surface 600A of single wall portion 600 of tubing 610. Butting surface 720 is located on the radially extending peripheral end surface of large-diameter portion 707. When each of nozzle 706 is inserted into longitudinal end portion 611 of tubing 610 upon hydrostatic forming, butting surface 720 is pressed on end surface 600A of single wall portion 600 of tubing 610 which is located in an opposed relation to butting surface 720 in the longitudinal direction of tubing 610. Butting surface 720 covers an entire area thereof to thereby suppress fluid leakage therefrom. Butting surface 720 and seal surface 724 cooperate with each other to prevent the pressurized fluid supplied into tubing 610 from leaking from longitudinal end portions 611 of tubing 610 upon hydrostatic forming.

During the hydrostatic forming operation, sealing between the inner circumferential surface of tubing 610 and the outer circumferential surface of small-diameter portion 716 of nozzle 706 can be ensured as shown in FIG. 35. Accordingly, pressing force of nozzle 706 can be limited to a minimum value sufficient to suppress fluid leakage. This achieves easy control of the pressing force of nozzle 706 depending upon the hydrostatic forming conditions, serving for increasing productivity.

As is understood from the above description, hydrostatic forming apparatus 700 can provide a hydrostatic-formed article using tubing 610 having clearance 617 at overlap portion 615, without fluid leakage from tubing 610. Hydrostatic forming apparatus 700 can reduce the production cost and increase the productivity. Further, inwardly projection overlap portion 615 of tubing 610 is received in recess 715 of nozzle 706, whereby the hydrostatic-formed article can be prevented from suffering from influence upon appearance thereof. As a result, the hydrostatic-formed article can have smooth appearance and excellent design. Accordingly, when the hydrostatic-formed article is joined with other parts, occurrence of interference therewith can be suppressed. Further, since upper die 702 is formed with no recess for receiving overlap portion 615 of tubing 610, the production cost of hydrostatic forming apparatus 700 can be reduced.

The method of hydrostatic forming of tubing 610 using hydrostatic forming apparatus 700 is explained. As illustrated in FIG. 36, tubing 610 is set into cavities 712 and 714 of upper and lower dies 702 and 704. At this time, positioning of tubing 610 is performed by engaging overlap portion 615 of tubing 610 in recess 715 of nozzle 706. Subsequently, upper and lower dies 702 and 704 are closed to clamp tubing 610. Nozzles 706 are axially moved and inserted into longitudinal end portions 611 of tubing 610 until seal surface 724 of each of nozzles 706 is pressed on the end surface of overlap portion 615 of tubing 610 to be in contact therewith, and at the same time, butting surface 720 of each of nozzles 706 is pressed on end surface 600A of single wall portion 600 of tubing 610 to be in contact therewith. In this state, clearance 617 between inner and outer circumferential end portions 601A and 601B of overlap portion 615 at each of longitudinal end portions 611 of tubing 610 is sealed. Pressing force of nozzle 706 can be limited to a minimum value sufficient to suppress fluid leakage. This can easily control the pressing force of nozzle 706 depending upon the hydrostatic forming conditions.

Subsequently, the pressurized fluid generating device is actuated to feed pressurized fluid to each of nozzles 706. The pressurized fluid is then supplied into tubing 610 via the fluid passage of nozzle 706. If required, upper and lower dies 702 and 704 can be relatively moved, and nozzles 706 can be axially moved. Thus, tubing 610 is formed into a hydrostatic-formed article having a desired shape.

As is understood from the above description, the method for hydrostatic forming of tubing 610 using hydrostatic forming apparatus 700 can reduce the production cost and increase the productivity.

This application is based on prior Japanese Patent Applications No. 2003-408688 filed on Dec. 8, 2003, No. 2003-429227 filed on Dec. 25, 2003 and No. 2004-089733 filed on Mar. 25, 2004. The entire contents of the respective Japanese Patent Applications Nos. 2003-408688, 2003-429227 and 2004-089733 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A tubing for hydrostatic forming, comprising:
   a first circumferential end portion;
   a second circumferential end portion:
   an overlap portion formed by the first and second circumferential end portions overlapping and joined with each other, the second circumferential end portion being overlaid on the first circumferential end portion;
   a fluid leakage preventing member for preventing pressurized fluid from leaking from the tubing upon the tubing being subjected to hydrostatic forming;
   first and second longitudinal end portions opposed to each other in a longitudinal direction of the tubing,
   wherein the fluid leakage preventing member comprises first and second fluid leakage preventing members disposed adjacent to the overlap portion in a circumferential direction of the tubing, wherein the first fluid leakage preventing member is disposed only on an inside of the first longitudinal end portion and the second fluid leakage preventing member is disposed only on an inside of the second longitudinal end portion.

2. The tubing as claimed in claim 1, further comprising a single wall portion, the second circumferential end portion forming a step radially projecting outward, the step having an amount of projection corresponding to a thickness of the single wall portion.

3. The tubing as claimed claim 1, wherein the tubing is made of metal, and each of the first and second fluid leakage preventing members comprises a weld overlay.

4. The tubing as claimed in claim 3, wherein each of the weld overlays has an inner surface smoothly continued to an inner circumferential surface of the tubing.

5. The tubing as claimed in claim 3, wherein each of the weld overlays is made of deposited metal having a hardness less than that of the metal making the tubing.

6. The tubing as claimed in claim 1, wherein the first fluid leakage preventing member comprises a projection formed on the first circumferential end portion at the first longitudinal end portion and the second fluid leakage preventing member comprises a projection formed on the first circumferential end portion at the second longitudinal end portion of the tubing.

7. The tubing as claimed in claim 1, further comprising a sealing member disposed between the first and second circumferential end portions of the overlap portion.

8. The tubing as claimed in claim 7, wherein the sealing member comprises a weld junction.

9. The tubing as claimed in claim 1, wherein each of the fluid leakage preventing members comprises an inner surface smoothly continued to inner surfaces of the first and second circumferential end portions, wherein each of the inner surfaces of the fluid leakage preventing members is disposed at one of the longitudinal end portions of the tubing.

10. The tubing as claimed in claim 9, wherein each of the inner surfaces of the fluid leakage preventing members is configured to eliminate an inside step disposed on an inner circumferential surface of the tubing adjacent to the overlap portion.

11. The tubing as claimed in claim 9, wherein each of the inner surfaces of the fluid leakage preventing members is located on a penetration weld.

12. The tubing as claimed in claim 9, wherein the overlap portion comprises a fillet weld extending adjacent to the second circumferential end portion in a longitudinal direction of the tubing.

13. The tubing as claimed in claim 11, wherein the inner surface of the penetration weld extends through the overlap portion and an inside step along a circumferential direction of the tubing.

14. The tubing as claimed in claim 11, wherein the inner surface of the penetration weld extends from each of end surfaces of the overlap portion along a longitudinal direction of the tubing.

15. The tubing as claimed in claim 13, wherein the penetration weld is formed within a limited region of each of the longitudinal end portions of the tubing.

16. The tubing as claimed in claim 11, wherein the penetration weld is formed by laser beam welding.

17. The tubing as claimed in claim 1, wherein the tubing is adapted to be applied to a structural member for automobiles which has a tubular portion.

18. A tubing for hydrostatic forming, comprising:

a first circumferential end portion;

a second circumferential end portion;

an overlap portion formed by the first and second circumferential end portions overlapping and joined with each other, the second circumferential end portion being overlaid on the first circumferential end portion; and a fluid leakage preventing member for preventing pressurized fluid from leaking from the tubing upon the tubing being subjected to hydrostatic forming, wherein the fluid leakage preventing member comprises an inner surface smoothly continued to inner surfaces of the first and second circumferential end portions, and the inner surface of the fluid leakage preventing member is disposed near longitudinal end portions of the tubing, and wherein the inner surface of the fluid leakage preventing member is located on a penetration weld.

19. The tubing as claimed in claim 18, wherein the inner surface of the penetration weld extends through the overlap portion and an inside step along a circumferential direction of the tubing.

20. The tubing as claimed in claim 18, wherein the inner surface of the penetration weld extends from each of end surfaces of the overlap portion along a longitudinal direction of the tubing.

21. The tubing as claimed in claim 19, wherein the penetration weld is formed within a limited region extending from an end surface of each of the longitudinal end portions of the tubing in a longitudinal direction of the tubing.

22. The tubing as claimed in claim 18, wherein the penetration weld is formed by laser beam welding.

* * * * *